(12) United States Patent
Kim et al.

(10) Patent No.: US 8,624,856 B2
(45) Date of Patent: Jan. 7, 2014

(54) TOUCH PANEL-INTEGRATED LIQUID CRYSTAL DISPLAY DEVICE

(75) Inventors: Dong-Sup Kim, Seoul (KR); Deuk-Su Lee, Goyang-si (KR); So-Haeng Cho, Goyang-si (KR); Se-Jong Yoo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 174 days.

(21) Appl. No.: 12/958,100

(22) Filed: Dec. 1, 2010

(65) Prior Publication Data

US 2011/0141042 A1  Jun. 16, 2011

(30) Foreign Application Priority Data

Dec. 10, 2009  (KR) ........................ 10-2009-0122662

(51) Int. Cl.
*G06F 3/041* (2006.01)
(52) U.S. Cl.
USPC ........................................................ 345/173
(58) Field of Classification Search
USPC ............. 345/156–184, 104; 178/18.01–20.04
See application file for complete search history.

(56) References Cited

U.S. PATENT DOCUMENTS

| | | | |
|---|---|---|---|
| 7,253,846 B2 * | 8/2007 | Song et al. ........................ | 349/12 |
| 8,269,743 B2 * | 9/2012 | Kuo et al. ...................... | 345/174 |
| 2009/0277695 A1 | 11/2009 | Liu et al. | |
| 2009/0278813 A1 | 11/2009 | Wijaya et al. | |
| 2010/0007616 A1 * | 1/2010 | Jang .............................. | 345/173 |
| 2010/0085326 A1 | 4/2010 | Anno | |
| 2010/0110041 A1 | 5/2010 | Jang | |
| 2011/0134056 A1 * | 6/2011 | Kim et al. ..................... | 345/173 |

FOREIGN PATENT DOCUMENTS

| | | |
|---|---|---|
| CN | 1361471 | 7/2002 |
| CN | 1506723 | 6/2004 |
| CN | 101236311 | 8/2008 |
| CN | 101261559 | 9/2008 |
| CN | 101556379 | 10/2009 |
| JP | 06-289405 | 10/1994 |
| KR | 10-2009-0119600 | 11/2009 |
| TW | 200949341 | 12/2009 |
| TW | 200950611 | 12/2009 |

* cited by examiner

*Primary Examiner* — Amr Awad
*Assistant Examiner* — Damon Treitler
(74) *Attorney, Agent, or Firm* — McKenna Long & Aldridge, LLP

(57) ABSTRACT

A liquid crystal display device includes a liquid crystal panel comprising a first substrate and a second substrate, a seal pattern arranged in the edge provided between the first and second substrates, and a liquid crystal layer, a plurality of first electrodes and second electrodes crossing each other and arranged in the seal pattern on an outer surface of the second substrate, a pad electrode for the touch panel partially overlapping the seal pattern on the outer surface of the second substrate, a pad electrode for the liquid crystal panel arranged at the outside of the seal pattern on the first substrate, a chip-on-film (COF) connected to the pad electrode for the liquid crystal panel, a printed circuit board for driving the liquid crystal panel, connected to the chip-on-film, a routing line to connect the pad electrode for the touch panel to the first electrodes and the second electrodes on the outer surface of the second substrate, and a flexible printed cable connected to pad electrodes for the touch panel, to receive driving signals of the first and second electrodes, the flexible printed cable connected to the printed circuit board.

19 Claims, 8 Drawing Sheets

TOUCH PANEL-INTEGRATED LIQUID CRYSTAL DISPLAY DEVICE

This application claims the benefit of Korean Patent Application No. 10-2009-0122662, filed on Dec. 10, 2009, which is hereby incorporated by reference as if fully set forth herein.

BACKGROUND OF THE INVENTION

1. Field of the Invention

The present invention relates to a touch panel. More specifically, the present invention relates to a touch panel-integrated liquid crystal display device wherein a touch panel is formed on the outer side of a substrate in a liquid crystal panel to reduce the total number of substrates used and to optimize the connection between a driving portion of the touch panel and a driving portion of the liquid crystal panel.

2. Discussion of the Related Art

In keeping with dramatic advances in information technology, displays to visualize electric information signals have been rapidly developed. Various slim, lightweight, and low-power flat display devices are commonly used as alternatives to conventional cathode ray tubes (CRTs).

Examples of flat display devices include liquid crystal displays (LCDs), plasma display panels (PDPs), field emission displays (FEDs), electroluminescent displays (ELDs) and the like. These flat display devices necessarily require a flat display panel to realize an image wherein the flat display panel has a structure in which a pair of transparent insulating substrates is joined such that an inherent luminous or polarized material layer is interposed between the substrates. Among flat display devices, liquid crystal display devices control light transmittance of liquid crystals using an electric field to display an image. For this purpose, an image display device includes a display panel including liquid crystal cells, a backlight unit to irradiate light to the display panel and a driving circuit to drive the liquid crystal cells.

The display panel is formed such that a plurality of gate lines cross a plurality of data lines to define a plurality of unit pixel regions. Each pixel region includes a thin film transistor array substrate and a color filter array substrate that face each other, a spacer interposed between the two substrates to maintain a predetermined cell gap, and a liquid crystal inserted into the cell gap.

The thin film transistor array substrate includes a plurality of gate lines and a plurality of data lines, a thin film transistor formed as a switching device at each intersection between the gate line and the data line, a pixel electrode arranged in each liquid crystal cell and connected to the thin film transistor, and an orientation layer coated on the resulting structure. The gate lines and data lines receive signals from driving circuits through respective pad portions.

In response to scan signals supplied to the gate lines, the thin film transistor transfers pixel voltage signals from the data lines to the pixel electrode.

In addition, the color filter array substrate includes color filters arranged in respective liquid crystal cells, a black matrix to partition the color filters and reflect external light, a common electrode to supply a reference voltage to the liquid crystal cells, and an orientation layer coated on the resulting structure.

The thin film transistor substrate and the color filter array substrate thus separately formed are arranged and then joined such that the two substrates face each other, liquid crystal is injected into a region provided between the substrates and the region is sealed, thereby completing fabrication of the liquid crystal display device.

There is an increasing need for a touch panel wherein a predetermined portion is touched by the hand or a separate input means and additional information can be transferred to the liquid crystal display device in response to the touch. Such a touch panel is adhered to the external surface of a liquid crystal display.

Touch panels are applied to a variety of information-processing systems since they have advantages of simplicity, reliability, portability, possible input of characters without using additional input systems and easy usage.

Depending upon how touch is sensed, touch panels are divided into resistive touch panels in which direct current is applied to a metal electrode formed in an upper or lower substrate and the touched position is determined from the gradient of voltage/resistance, capacitive touch panels in which a predetermined electric current is formed on a conductive film and positions in which voltage variations occur in upper and lower substrates upon touch are thus sensed and electromagnetic touch panels in which LC induced when an electric pen contacts a conductive film is read to sense the touched position.

Among the touch panels, capacitive-type touch panels include a plurality of x electrodes and a plurality of y electrodes that cross each other arranged on a transparent substrate such that an insulating layer is interposed between the x electrode and the y electrode and sense touch by sensing whether or not electric capacity generated between the x and y electrodes is changed.

Depending on the touch sensation type, touch panels are classified into resistive touch panels, capacitive touch panels and infrared (IR) touch panels. In view of factors such as convenience of fabrication and sensitivity, capacitive touch panels attract much attention in small-size models.

Hereinafter, a conventional touch panel-provided liquid crystal display device will be described with reference to the annexed drawings in detail.

FIG. 1 is a sectional view illustrating a conventional touch panel-provided liquid crystal display device.

As shown in FIG. 1, the conventional touch panel-provided liquid crystal display device comprises: a liquid crystal panel 10 including first and second substrates 1 and 2, a liquid crystal layer 3 filled between the first and second substrates 1 and 2, first and second polarizing plates 4a and 4b adhered to the outer surface of the first substrate 1 and the second substrate 2, respectively; a capacitive-type touch panel 20 placed on the liquid crystal panel 10; and a cover glass 30 to protect the top of the touch panel 20.

The first substrate of the liquid crystal panel is provided with gate lines and data lines which cross each other to define pixel regions, a thin film transistor (TFT) formed at the intersection between the gate line and the data line and a thin film transistor array provided with a pixel electrode (not shown) in the pixel region.

The first substrate 1 is further provided at one side thereof with a printed circuit board (PCB) 8 to drive the gate lines and the data lines.

In addition, the second substrate 2 is provided with a black matrix layer, a color filter layer and a common electrode (not shown, Vcom (applied voltage)).

The structure of the touch panel 20 may be varied depending on the operation mode. For example, a capacitive-type touch panel senses touch position via variation in electric capacity, based on capacitance generated between first and second electrodes which cross each other.

In addition, the touch panel 20 is further provided on the side thereof with a touch driving circuit 25 to operate the touch panel.

Meanwhile, a cover glass 30 to protect the touch panel 20 is further provided on the touch panel.

For the afore-mentioned conventional touch panel-provided liquid crystal display, the touch driving circuit 25 for driving the touch panel 20 is separately formed from the PCB 8 for driving the liquid crystal panel 10, and the touch driving circuit 25 and the PCB 8 are connected to the system driving circuit (not shown) in a system including the liquid crystal panel 10, the touch panel 20 and the cover glass 30.

In this case, in order to connect the touch driving circuit 25 and the PCB 8 to a system driving circuit, connectors and areas to mount the same are required. Such mounting areas cause an increase in the size of the periphery. Also, connectors should be separately provided, disadvantageously requiring numerous manual labor-intensive mounting operations.

In addition, the touch panel 20 is provided at the exterior of the liquid crystal panel 10, thus requiring a double-sided adhesive layer between the touch panel 20 and the liquid crystal panel 10. In this case, a process for forming the touch panel 20, apart from the liquid crystal panel 10, and a process for adhering the touch panel 20 to the liquid crystal panel 10 are required, disadvantageously causing an increase in total thickness caused by use of a plurality of substrates and lengthened process period.

In addition, when the cover glass 30 is provided, a double-sided adhesive layer is also provided between the touch panel 20 and the cover glass 30 to join the cover glass 30 to the touch panel 20.

The conventional liquid crystal display device including a touch panel has the following problems.

First, the touch panel and the liquid crystal panel are separately formed and an adhesive layer is interposed between the panels to join the panels. As a result, the total number of glass substrates required is four to five, that is, two substrates for the liquid crystal panel and two substrates for the touch panel and a cover glass, thus making it impossible to reduce the thickness of the liquid crystal display device. That is, for example, the glass substrate is the thickest, about 0.7T (mm), among all of the elements. This is the reason that the glass substrate is used for cover glasses to protect the touch panel, the liquid crystal panel and the touch panel.

Second, the thickness of the touch panel makes direct connection between the touch driving portion circuit and the PCB for driving the liquid crystal panel impossible and connection thereof is separately realized in a system-driving portion, thus making it impossible to realize circuit integration in the device.

Third, an area to mount the touch driving portion circuit and the PCB for driving the liquid crystal panel is required, thus increasing the size of the periphery of the device and decreasing an active area of the device.

Fourth, the driving circuit of the touch panel requires a long wire for connecting the system-driving portion arranged thereunder due to the thickness of the touch panel and the thickness of the liquid crystal panel, thus making it difficult to simplify mounting of the touch driving circuit.

SUMMARY OF THE INVENTION

Accordingly, the present invention is directed to a liquid crystal display device comprising a touch panel that substantially obviates one or more problems due to limitations and disadvantages of the related art.

It is one object of the present invention to provide a touch panel-integrated liquid crystal display device wherein a touch panel is formed on an outer surface of a substrate in a liquid crystal panel to reduce the total number of substrates used and to optimize the connection between a driving portion of the touch panel and a driving portion of the liquid crystal panel.

To achieve these objects and other advantages and in accordance with the purpose of the invention, as embodied and broadly described herein, provided is a touch panel-integrated liquid crystal display device including: a liquid crystal panel comprising a first substrate and a second substrate crossing each other, a seal pattern arranged in the edge provided between the first and second substrates, and a liquid crystal layer filled between the first and second substrates; a plurality of first electrodes and second electrodes crossing each other and arranged in a region corresponding to the seal pattern on an outer surface of the second substrate; a pad electrode for the touch panel partially overlapping the seal pattern on the outer surface of the second substrate, the pad electrode extending to the periphery of the seal pattern; a pad electrode for the liquid crystal panel arranged at an outside of the seal pattern on the first substrate; a chip-on-film (COF) connected to the pad electrode for the liquid crystal panel; a printed circuit board for driving the liquid crystal panel, connected to the chip-on-film; a routing line to connect the pad electrode for the touch panel to the first electrodes and the second electrodes on the outer surface of the second substrate; and a flexible printed cable connected to pad electrodes for the touch panel, to receive driving signals of the first and second electrodes, the flexible printed cable connected to the printed circuit board.

The liquid crystal display device may further include: a first polarizing plate arranged on an outer surface of the first substrate; and a second polarizing plate on the outer surface of the second substrate, wherein the second polarizing plate is arranged on an entire surface including the first and second electrodes.

The first electrode may include first diamond patterns provided with a plurality of spaced transparent electrodes and a connection metal arranged in a different layer to connect the first diamond patterns adjacent, and the second electrode may be a transparent electrode in which a plurality of spaced second diamond patterns are integrated with connection patterns to connect the second diamond patterns adjacent.

The first diamond patterns of the first electrode, the second diamond patterns of the second electrode and the connection patterns may be present in the same layer.

The liquid crystal display device further include: an insulating layer interposed between the outer surface of the second substrate, and the first diamond patterns, the second diamond patterns and the connection patterns, wherein the insulating layer is provided with a contact hole to electrically connect the first electrode to the connection metal.

The pad electrode for touch panel, the routing line and the connection metal may be present in the same layer.

The printed circuit board for driving the liquid crystal panel and the flexible printed cable may be arranged at different sides of the liquid crystal panel. The flexible printed cable may be connected to the printed circuit board for driving the liquid crystal panel via a wire.

The printed circuit board for driving the liquid crystal panel and the flexible printed cable may be arranged at the same side of the liquid crystal panel, wherein the chip-on-film and the flexible printed cable are alternately connected to the printed circuit board for driving the liquid crystal panel.

Meanwhile, the flexible printed cable may be provided in plural for divisional driving of the touch panel arranged on the second substrate.

The flexible printed cable may be provided with a touch panel controller to apply signals to the first and second electrodes and to detect signals sensed by the electrodes.

The touch panel controller may be provided in plural on the flexible printed cable.

In accordance with another aspect of the present invention, provided is a touch panel-integrated liquid crystal display device including: a liquid crystal panel including a first substrate and a second substrate crossing each other, a seal pattern arranged in the edge provided between the first and second substrates, and a liquid crystal layer filled between the first and second substrates; a plurality of first electrodes and second electrodes crossing each other, and arranged in a region corresponding to the seal pattern on the outer surface of the second substrate; a pad electrode for the touch panel partially overlapping the seal pattern on the outer surface of the second substrate, the pad electrode extending to the periphery of the seal pattern; a pad electrode for the liquid crystal panel arranged at the outside of the seal pattern on the first substrate; a chip-on-film (COF) connected to the pad electrode for the liquid crystal panel; a printed circuit board for driving the liquid crystal panel, connected to the chip-on-film; a routing line to connect the pad electrode for the touch panel to the first electrodes and the second electrodes on the outer surface of the second substrate; and a wire connected to pad electrodes for the touch panel to receive driving signals of the first and second electrodes, the wire connected to the printed circuit board for driving the liquid crystal panel.

The wire may be connected through the chip-on-film to the printed circuit board for driving the liquid crystal panel.

The printed circuit board for driving the liquid crystal panel connected to the wire may be further provided with a touch panel controller to apply signals to the first and second electrodes and to detect signals sensed by the electrodes.

The wire may be provided in plural.

The liquid crystal display device further include: a first polarizing plate arranged on the outer surface of the first substrate; and a second polarizing plate arranged on an entire surface including the first and second electrodes on the outer surface of the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, a touch panel-integrated liquid crystal display device according to the present invention will be described with reference to the annexed drawings in detail.

Figure 1:
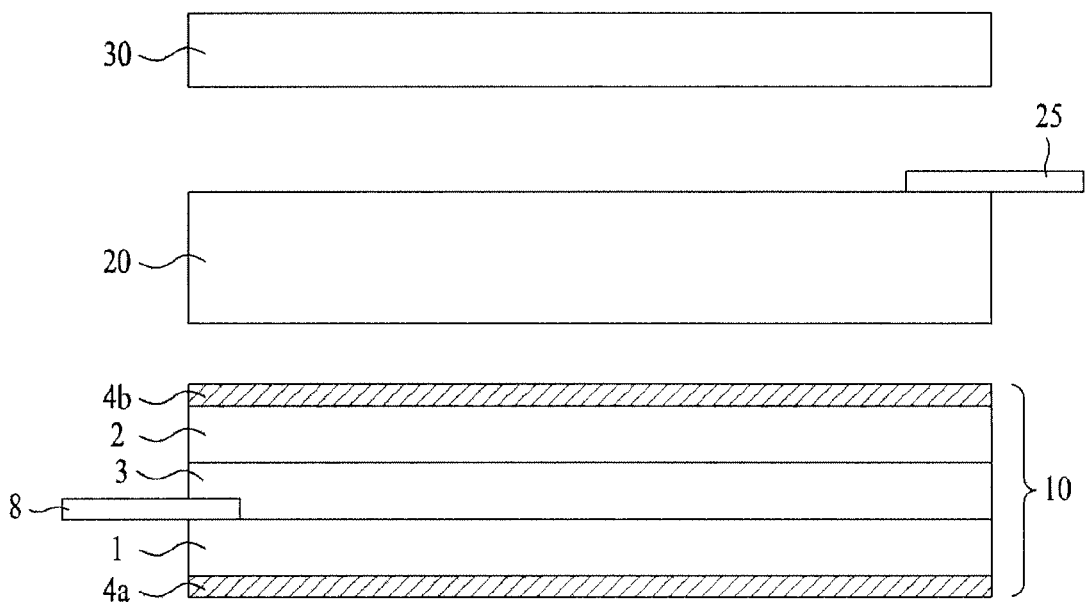
FIG. 1 is a sectional view illustrating a related art touch panel-provided liquid crystal display device.
Figure 2:
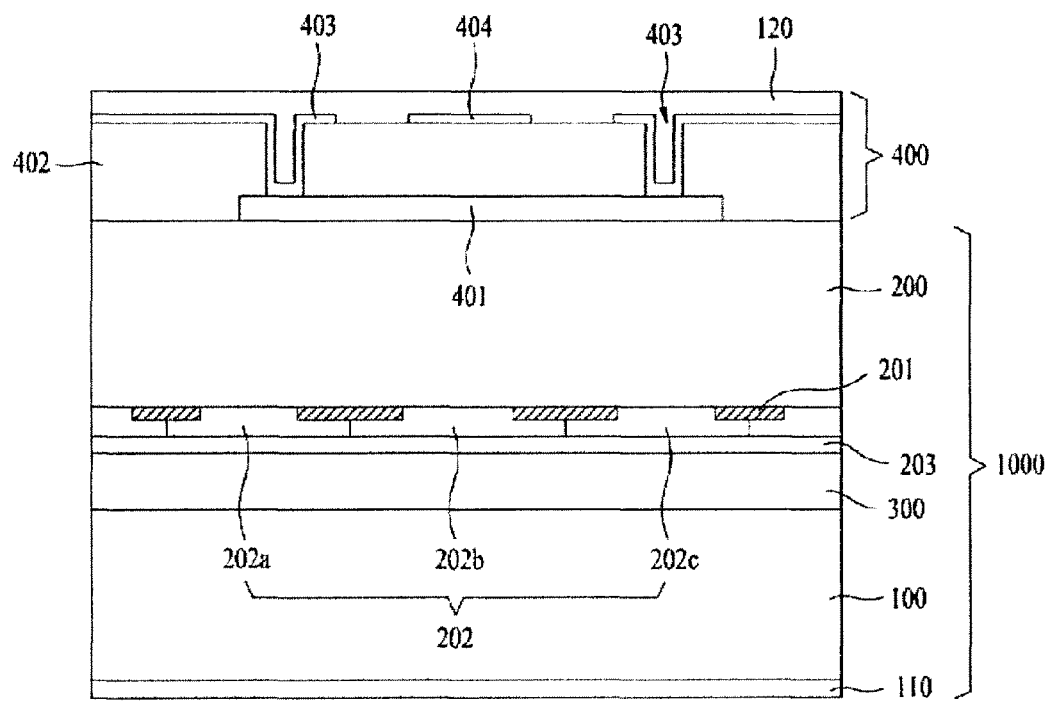
FIG. 2 is a sectional view illustrating a touch panel-integrated liquid crystal display device according to the present invention.
Figure 3:
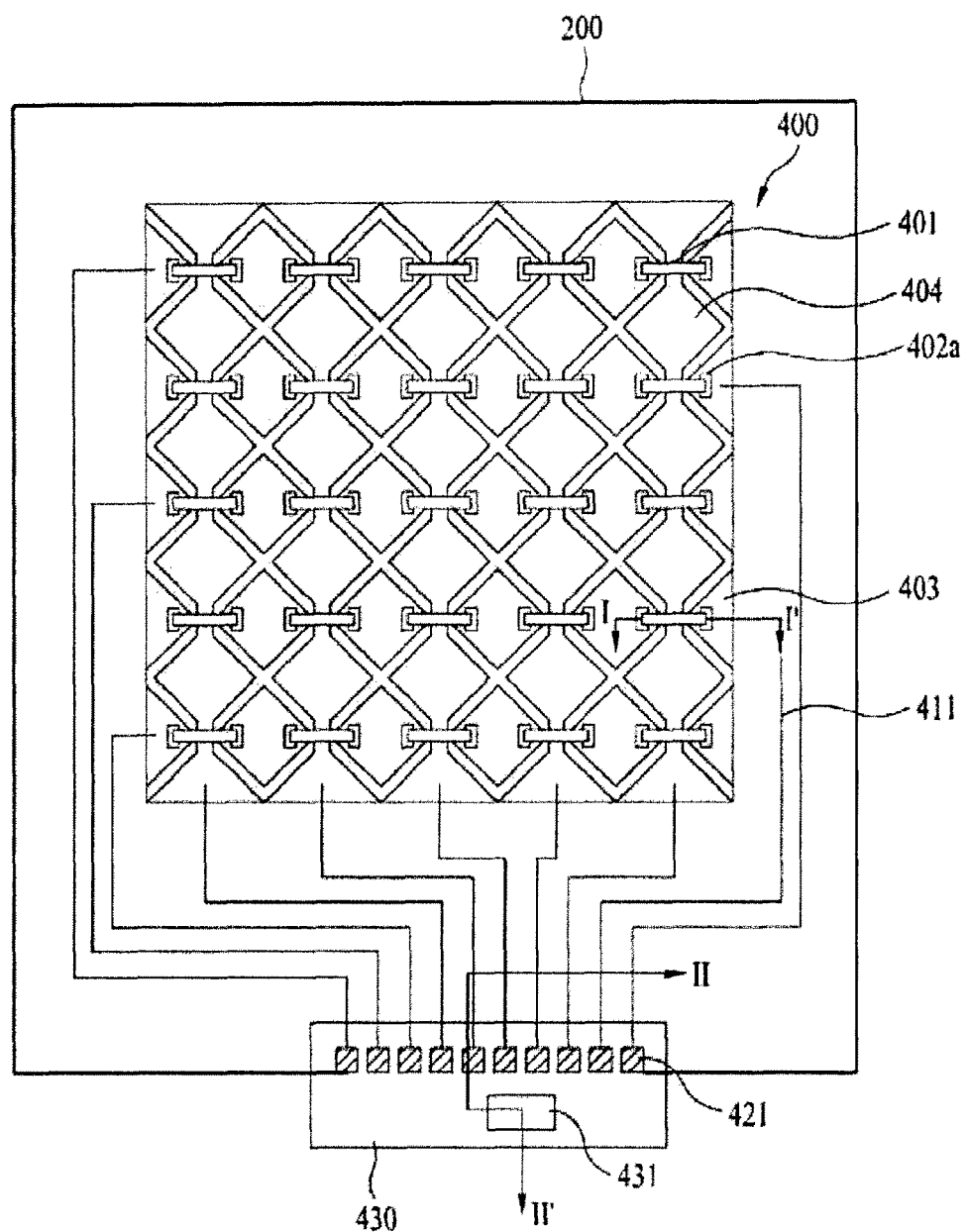
FIG. 3 is a plan view illustrating the touch panel of FIG. 2.
Figure 4:
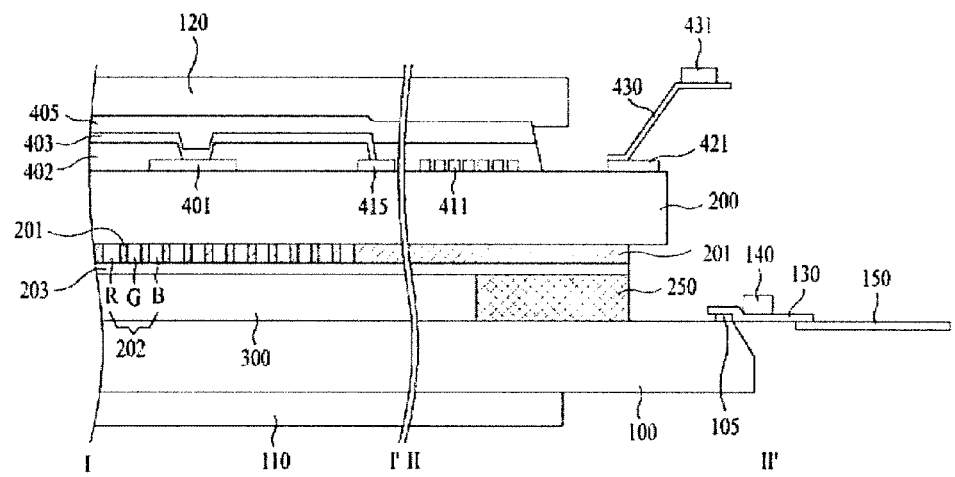
FIG. 4 is a sectional view taken along the lines of I-I' and II-II' of FIG. 3.

FIG. 2 is a sectional view illustrating the touch panel-integrated liquid crystal display device according to the present invention, FIG. 3 is a plan view illustrating the touch panel of FIG. 2, and FIG. 4 is a sectional view taken along the lines of I-I' and II-II' of FIG. 3.

As shown in FIGS. 2 to 4, the touch panel-integrated liquid crystal display device comprises: a liquid crystal panel 1000 including a first substrate 100 and a second substrate 200 crossing each other, and a liquid crystal layer 300 filled between the first and second substrates 100 and 200; and a touch panel 400 provided on an outer surface of the second substrate 200.

The first substrate 100 present in the liquid crystal panel 1000 is provided with gate lines and data lines which cross each other to define pixel regions and a thin film transistor array (not shown) comprising a thin film transistor (TFT) in the pixel region. Also, as shown in FIG. 4, a COF (chip-on-film: 130) connected to the pad electrode 105 provided on the end of the gate lines and data lines on one side of the first substrate 100 and a PCB 150 connected to the other end of the COF (130) are further provided.

The COF 130 includes a drive IC 131 to transfer signals of each of the data lines or gate lines to each of a plurality of regions. If appropriate, the gate driving signals of the gate lines may be transferred via a line on glass (LOG) formed on an edge of the first substrate 100. In this case, a connection line is further provided in a part of the COF 130, to connect a gate driving signal output terminal of the PCB 150 to the pad electrode of the LOG line.

Meanwhile, the PCB 150 is connected to the other side of the COF 130 and includes a controller (not shown) to receive image information from a host system (not shown), make the same suitable for the panel and generate various control signals, and a power supply to generate various signals at a set voltage.

Also, when the gate driving portion is provided in the form of an LOG line, no additional gate PCB is required, the PCB 150 can be configured using only one source PCB corresponding to pad electrodes of the data lines.

Also, a black matrix layer 201, color filter layers 202 (R(202a), G(202b), B(202c)) and a common electrode 203 are formed in the thin film transistor array on the second substrate 200.

The black matrix layer 201 is formed in a region corresponding to the gate lines, the data lines and the thin film transistor in the thin film transistor array.

The color filter layer 202 is formed in each pixel region.

Also, the common electrode 203 is formed in the black matrix layer 201 and the color filter layer 202 (R, G, B) over an entire surface of the second substrate 200.

Also, a liquid crystal layer 300 is formed in a region provided between the first and second substrates 100 and 200 including the thin film transistor array and the color filter array, and a seal pattern 250 to define a region that is filled with the liquid crystal layer 300 is formed at an edge of the first and second substrates 100 and 200.

In this case, the seal pattern 250 is a non-display region and is shielded by extending the black matrix layer 201 on the second substrate in order to prevent light leakage.

That is, an inner part of the seal pattern 250 is defined as a display region in which display is actually realized.

Also, a touch panel 400 provided with the plurality of layers including the first and second electrodes is formed on the outer surface of the second substrate 200 using the second substrate 200 as a touch panel-formation side.

The touch panel 400 comprises a plurality of first electrodes 403 arranged in parallel in an X-axis direction and a plurality of second electrodes 404 arranged in parallel in a Y-axis direction.

Also, the first electrode 403 and the second electrode 404 are spaced from each other on an insulating layer 402 formed on the outer surface of the second substrate 200, and the first electrode 403 and the second electrode 404 are in the form of a diamond in a sensing region and there is a difference in the intersection configuration between the first and second electrodes 403 and 404. That is, for the first electrode 403, adjacent diamond patterns are connected through a connection metal 401 connected via a contact hole 402a provided in the insulating layer 402 to apply common signals to the diamond-shaped first electrodes 403 arranged in the X-axis direction. The second electrode 404 is provided with a thin connection pattern to connect adjacent integral diamond patterns to apply common signals to the second electrodes 404 arranged in the Y-axis direction.

Meanwhile, the first and second electrodes 403 and 404 are transparent electrodes made of a material such as indium tin oxide (ITO), indium zinc oxide (IZO), indium tin zinc oxide (ITZO), and the connection metal 401 is composed of a highly conductive material such as molybdenum (Mo) or a molybdenum alloy (e.g., Mo/AlNd), silver, copper, aluminum or an alloy thereof to realize connection without increasing resistance in spite of using a thin connection portion.

The connection portion of the first electrode 403 is composed of a highly conductive connection metal and a connection portion of the second metal 404 is composed of a transparent electrode, thus causing difference in resistance between two electrodes. Taking into consideration the resistance difference, a total area of the second electrode 404 is designed to be smaller than that of the first electrode 403 and thus reduce the influence of the resistance difference.

Also, the insulating layer 402 including the contact hole 402a is an inorganic insulating layer such as an oxide layer or a nitride layer, or an organic insulating layer such as photo acryl.

Meanwhile, first and second polarizing plates 110 and 120 are formed on an outer surface of the first substrate 100 and on an upper surface (outer surface) including the first and second electrodes 403 and 404 of the liquid crystal panel 1000, respectively.

The formation surface of the touch panel 400 utilizes the outer surface of the second substrate 200 without using an additional glass substrate or plastic substrate, thus omitting a process for joining to the substrates. For this reason, the second polarizing plate 120 is arranged on the upper surface of the touch panel 400.

The first and second polarizing plates 110 and 120 are provided with an adhesive layer on the first substrate 100 or an opposite surface of the first and second electrodes 403 and 404, and the adhesive layer is embedded in the opposite surface to adhere an outer surface of the first substrate 100 to the first and second electrodes 403 and 404 arranged at an outer surface of the second substrate 200.

In this case, an additional interlayer dielectric layer (represented by reference numeral "405" of FIG. 4) to protect the first and second electrodes 403 and 404 may be further provided between an entire surface of the first and second electrodes 403 and 404, and the second polarizing plate 120. In this case, the interlayer dielectric layer 405 may be composed of the same material as the insulating layer 402, for example, an inorganic insulating layer such as a nitride layer or an oxide layer or an organic insulating layer such as photo-acryl.

A touch pad region is defined in a part of the touch panel 400 and the touch pad region is provided with pad electrodes 421 and thus connected to a flexible printed cable (FPC) 430 including a touch controller 431 to generate touch-driving signals.

The connection metal 401 and the pad electrode 421 are simultaneously formed, and at the same time, routing lines 411 to apply signals to the first and second electrodes 403 and 404 are also formed. Furthermore, a routing contact line 415 to contact the routing lines 411 with the first electrodes 403 or the second electrodes 404 is formed on the end of the first and second electrode 403 and 404.

The pad region is formed over the seal pattern 250 of the liquid crystal panel 100. The pad electrode 421 partially overlaps the seal pattern 250 and is formed at the edge of the second substrate 200.

A method for forming the touch panel-integrated liquid crystal display device is as follows.

The first electrodes 403 and the second electrodes 404 are arranged in a display region (a display region in a seal pattern region) of the second substrate 200 on the outer surface of the second substrate 200 and a routing line 411, a pad electrode 421, an insulating layer 402 and an interlayer dielectric layer 405 are formed in the periphery thereof to constitute a touch panel 400.

Subsequently, the second substrate 200 provided with the touch panel 400 is reversed to form a color filter array and a thin film transistor array on the second substrate 200 and the first substrate 100, respectively.

Subsequently, a seal pattern 250 is formed at one edge of the first substrate 100 or the second substrate 200, the substrates are joined and a liquid crystal layer is injected between the first and second substrates to define the seal pattern. Alternatively, a seal pattern 250 is formed on one of the first and second substrates 100 and 200, liquid crystals are poured onto the substrate and the substrate is joined to the opposite substrate to define the liquid crystal layer 300 between the first and second substrates 100 and 200.

Subsequently, a first polarizing plate 110 and a second polarizing plate 120 are adhered to the bottom of the first substrate 100 and on the touch panel 400 present on the second substrate 200, respectively.

Subsequently, the FPC 430, including the pad electrode 421 and the touch controller 431 in the touch panel 400, is connected to the outer surface of the second substrate 200.

The pad electrode 105 of the first substrate 100 is connected to the PCB 150 via a COF 130 at one side of the PCB 150. The COF 130 is provided with a drive IC 140 to transfer a driving waveform to be provided in the gate lines or data lines.

Subsequently, the FPC 430 is adhered to the side of the second substrate 200 to allow the touch electrode arranged at one side of the second substrate 200 to be operated through the touch controller 431.

Also, the first and second polarizing plates 110 and 120 include a display region of the liquid crystal panel 1000 and partially overlap an inner side of the seal pattern 250.

In this case, the pad electrode 421 is formed in the outside of the second polarizing plate 120 and the FPC 430 connected to the pad electrode 421 is bent into a lower part of the liquid crystal panel 1000 together with the PCB 150.

Hereinafter, various embodiments with different planar locations of the FPC 430 including the touch controller 431 of the touch panel 400 will be described.

Figure 5:
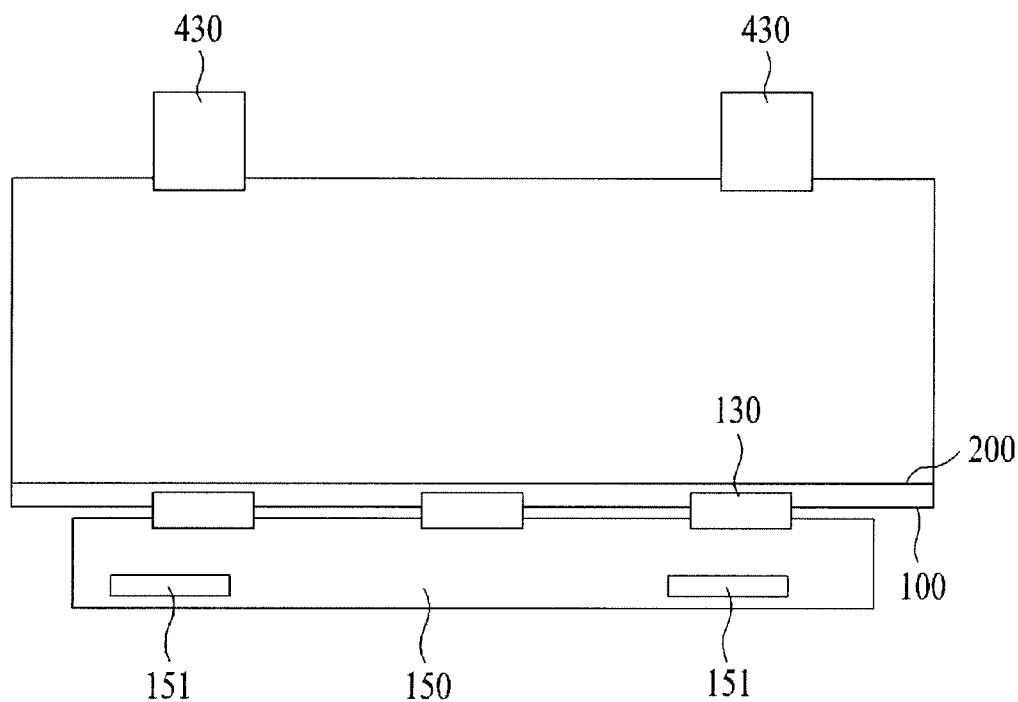
FIG. 5 is a plan view illustrating connection between a touch panel driving portion and a liquid crystal panel driving portion for a touch panel-integrated liquid crystal display device according to a first embodiment of the present invention.

FIG. 5 is a plan view illustrating connection between a touch panel driving portion and a liquid crystal panel driving portion for a touch panel-integrated liquid crystal display device according to a first embodiment of the present invention.

As shown in FIG. 5, for the touch panel-integrated liquid crystal display device according to the first embodiment, the FPC 430 for driving the touch panel 400 is formed at one outer surface (upper part of the drawing) of the second substrate 200 and the PCB 150 for driving the liquid crystal panel is formed at the other side (lower part of the drawing) of the first substrate 100.

In this case, the other side provided with the PCB 150 of the first substrate 100 protrudes, as compared to the second substrate 200, the seal pattern (reference numeral "250" in FIG. 4 of the first and second substrates 100 and 200 is formed at the edge in which the first and second substrates 100 and 200 overlap each other, partially overlaps the seal pattern 250 and the periphery thereof is connected to the FPC 430 for driving the touch panel 400.

Reference numeral 151, not illustrated herein, is a connector of the PCB 150 and is connected to a host system (not shown).

Similarly, although not shown, the FPC 430 is further provided with a wire to connect the FPC 430 to the host system and thus synchronize control of the touch panel with driving of the liquid crystal panel 1000.

In this case, for the touch panel-integrated liquid crystal display device according to the first embodiment, the PCB 150 and the FPC 430 are arranged opposite to each other and are bent to a lower part of the liquid crystal panel 1000. In this case, the FPC 430 is bent such that it passes a larger part of the second substrate 200, as compared to the PCB 150 connected to the COF 130. However, the FPC 430 is a flexible circuit substrate, and does not pass a glass substrate including a plurality of layers and further passes only a monolayer-second substrate at the vertically bent side surface monolayer-second substrate and may be thus sufficiently bent toward a lower side of the liquid crystal panel 1000, when compared to a conventional structure.

In this case, in order to prevent separation of the FPC 430, the liquid crystal panel 1000 may be further provided at one side thereof with a double-sided tape. If necessary, after the second substrate 200 is slimized to a predetermined thickness by etching, the touch panel 400 is formed and the FPC 430 is connected to minimize separation of the FPC 430.

The side corresponding to the side of the second substrate 200 or the first substrate 100, in which the FPC 430 is bent, is a region in which the pad electrode is not formed. Metal lines formed in the FPC 430 do not cause short.

Meanwhile, as shown in the drawing, one or two FPCs 430 may be present on the second substrate 200. If necessary, three or more FPCs 430 may be present. The number of FPCs 430 is determined by comparing the number of pad electrodes (represented by reference numeral "411" in FIG. 4) in the touch panel 400 with the number of output terminals in the FPC 430. Specifically, when the number of the pad electrodes 411 is more than the number of output terminals in the FPC 430, plural FPCs are provided.

Figure 6:
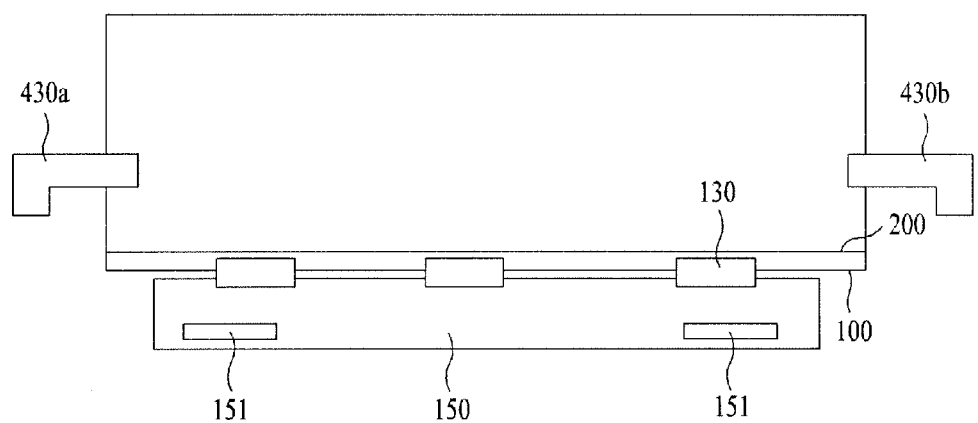
FIG. 6 is a plan view illustrating connection between a touch panel driving portion and a liquid crystal driving portion for a touch panel-integrated liquid crystal display device according to a second embodiment of the present invention.

FIG. 6 is a plan view illustrating connection between a touch panel driving portion and a liquid crystal driving portion for a touch panel-integrated liquid crystal display device according to a second embodiment of the present invention.

The touch panel-integrated liquid crystal display device according to the second embodiment shown in FIG. 6 is different from that of the first embodiment in that FPCs 430a and 430b are arranged at both sides of the second substrate 200.

Similarly, the FPCs 430a and 430b are formed in a different direction than the PCB 150, and the first substrate 100 overlaps the second substrate 200 at one side in which the FPCs 430a and 430b are formed. In this overlap region, there is no risk of shorting of metal lines formed in the FPCs 430a and 430b. Also, an additional double-sided tape is provided at one side of the first substrate 100 or second substrate 200 corresponding to the FPCs 430a and 430b to allow the FPCs 430a and 430b to be bent to a lower part of the liquid crystal panel 1000 without causing separation of the FPCs 430a and 430b.

A detailed explanation of the same elements as the first embodiment is omitted.

Figure 7:
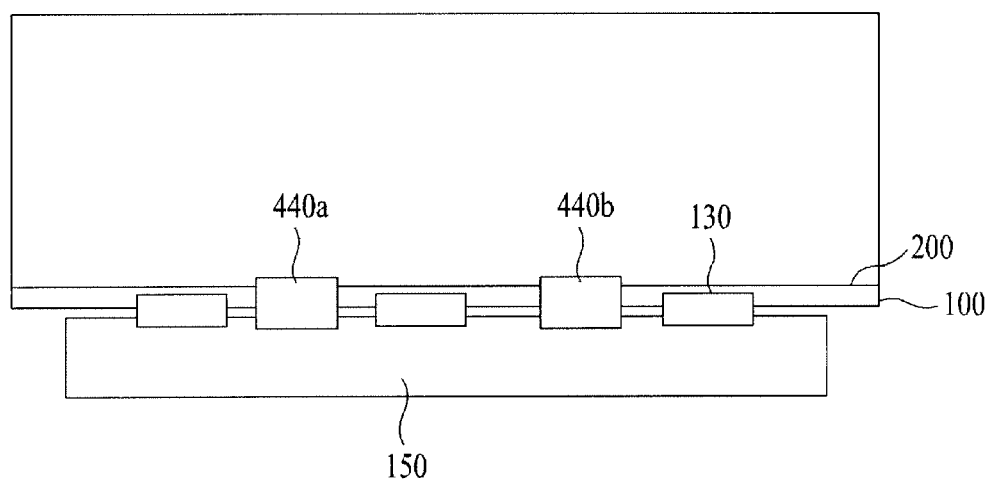
FIG. 7 is a plan view illustrating connection between a touch panel driving portion and a liquid crystal panel driving portion for a touch panel-integrated liquid crystal display device according to a third embodiment of the present invention.
Figure 8:
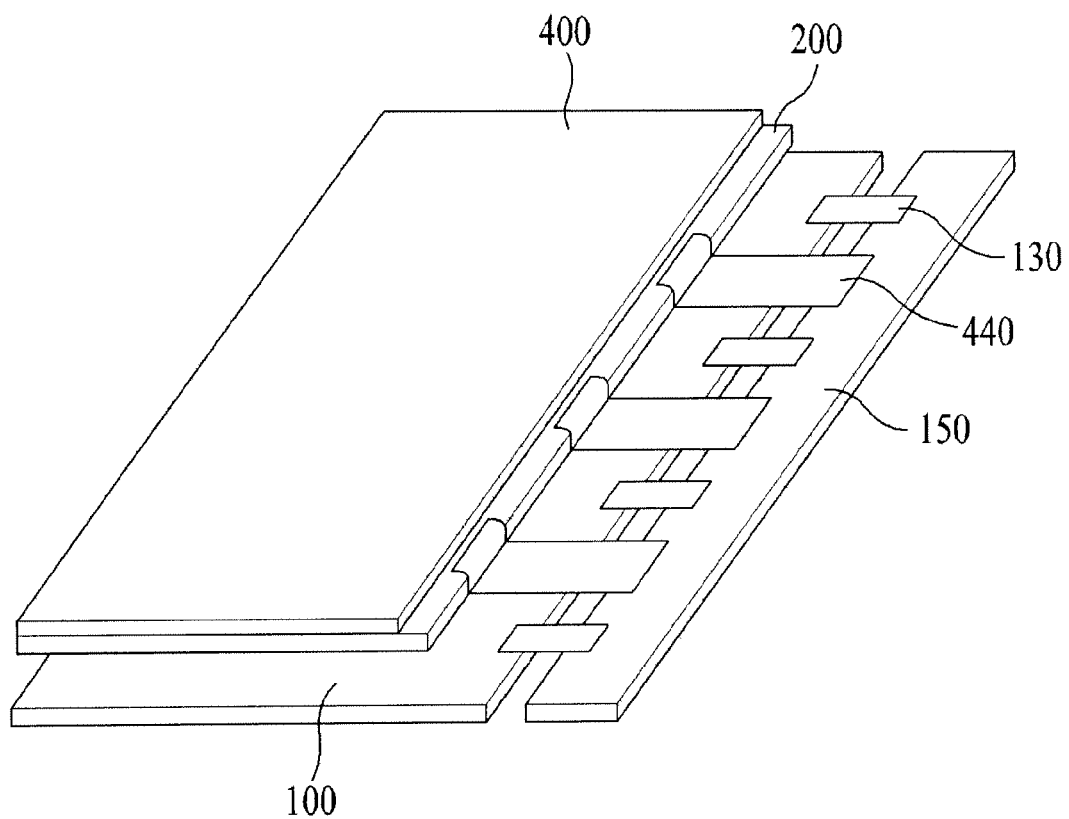
FIG. 8 is a perspective view illustrating a variant of the touch panel-integrated liquid crystal display device of FIG. 7.

FIG. 7 is a plan view illustrating connection between a touch panel driving portion and a liquid crystal panel driving portion for a touch panel-integrated liquid crystal display device according to a third embodiment of the present invention. FIG. 8 is a perspective view illustrating a variant of the touch panel-integrated liquid crystal display device of FIG. 7.

As shown in FIGS. 7 and 8, for the touch panel-integrated liquid crystal display device according to the third embodiment, FPCs 440a and 440b alternate with the COF 130 connected to the PCB 150 on the side at which the PCB 150 is formed. At this time, when one side of FPCs 440a and 440b is connected to the pad electrode of the touch panel in order to drive the touch panel and is bent at one side of the second substrate 200, the other side thereof is connected to the PCB 150. That is, in this case, the other side of the FPC 440a or 440b is connected to one side of the PCB 150 to synchronize and control operation of the touch panel through a timing controller (liquid crystal panel driving portion).

Meanwhile, when compared to FIG. 7, FIG. 8 shows an embodiment in which the numbers of COF and FPC are varied and configuration of one side of the second substrate 200 is the same as in the previous embodiment).

As such, in the third embodiment, the PCB 150 can be connected to the FPCs 440a and 440b without using additional connectors and configuration thereof is thus simplified, as compared to the afore-mentioned first and second embodiments.

Figure 9:
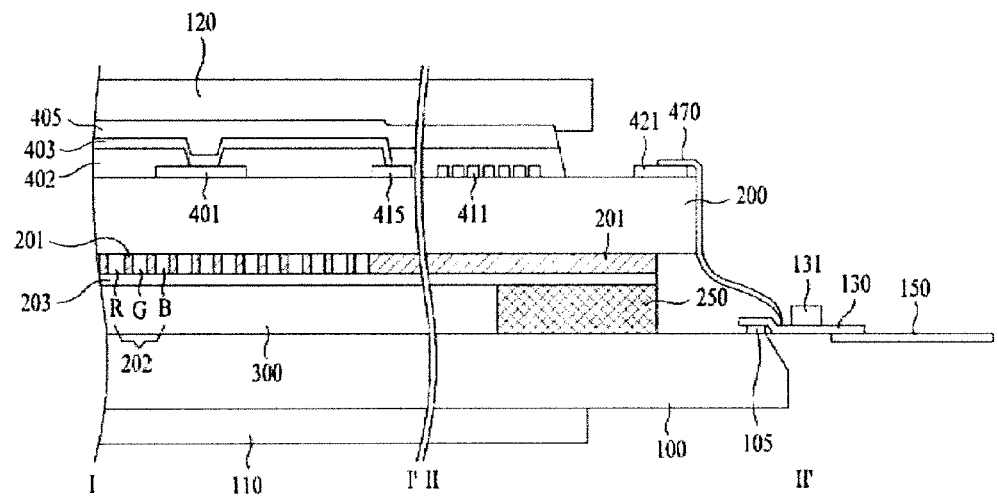
FIG. 9 is a sectional view illustrating a touch panel-integrated liquid crystal display device according to a fourth embodiment of the present invention.

FIG. 9 is a sectional view illustrating a touch panel-integrated liquid crystal display device according to a fourth embodiment of the present invention.

As shown in FIG. 9, for the touch panel-integrated liquid crystal display device according to the fourth embodiment, the FPC is replaced by a wire 450, when compared to the afore-mentioned configuration in FIG. 4, and in this case, the wire 450 is connected to one side of the COF 130 and receives signals from the PCB 150 through metal lines of the COF 130. In this case, signals for driving the touch panel 400 are generated in the PCB 150 and a controller (not shown) of the touch panel 400 is provided in the PCB 150.

Figure 10:
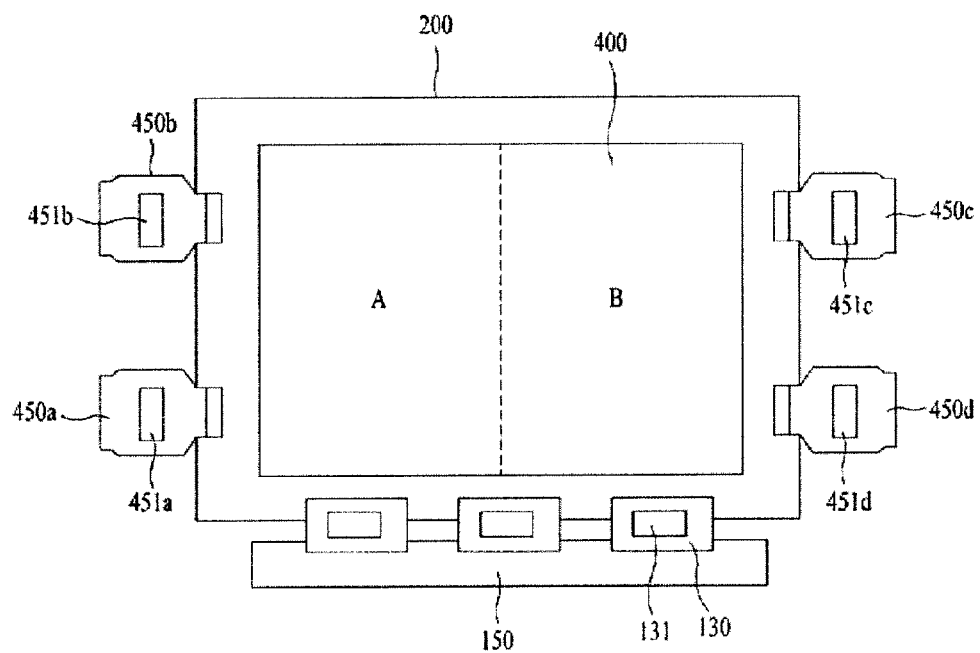
FIG. 10 is a plan view illustrating connection between a touch panel driving portion and a liquid crystal panel driving portion for a touch panel-integrated liquid crystal display device according to a fifth embodiment of the present invention.

FIG. 10 is a plan view illustrating connection between a touch panel driving portion and a liquid crystal panel driving portion for a touch panel-integrated liquid crystal display device according to a fifth embodiment of the present invention.

As shown in FIG. 10, for the touch panel-integrated liquid crystal display device according to the fifth embodiment, the touch panel 400 is divided into, two driving regions, an A region and a B region, and two FPCs 450a and 450b (or 450c and 450d) are provided in each region. Each FPC 450a, 450b, 450c and 450d includes a driving chip 451a, 451b, 451c and 451d, respectively.

In this case, the FPCs 450a, 450b, 450c and 450c are connected to the PCB 150 through wires (not shown) or connectors (not shown) and the PCB 150 is connected to a host system (not shown) through a separate connector (not shown).

Figure 11:
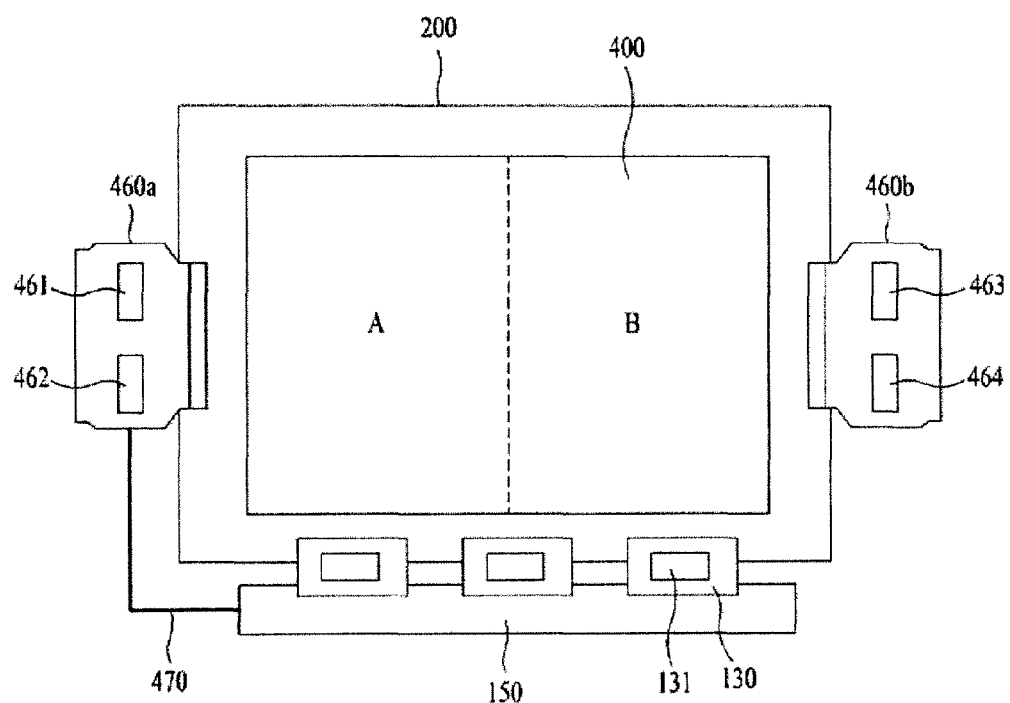
FIG. 11 is a plan view illustrating connection between a touch panel driving portion and a liquid crystal panel driving portion for a touch panel-integrated liquid crystal display device according to a sixth embodiment of the present invention.

FIG. 11 is a plan view illustrating connection between a touch panel driving portion and a liquid crystal panel driving portion for a touch panel-integrated liquid crystal display device according to a sixth embodiment of the present invention.

The touch panel-integrated liquid crystal display device according to the sixth embodiment is different from that of the fifth embodiment in that two chips 461 and 462 (or 463 and 464) are provided in one FPC 460a or 460b in each divisional driving region.

Meanwhile, in the afore-mentioned embodiments, the FPC and (touch panel) pad electrode connected thereto are formed over the seal pattern 250, to endure shock generated upon bonding the FPC to the pad electrode and thus prevent damage to cells.

When bonding the FPC in which the pad electrode is formed on the seal pattern, it may be difficult to perform desired alignment and indentation tests. Accordingly, the pad electrode is arranged such that it partially overlaps the seal pattern to endure shock applied to the liquid crystal panel upon bonding, facilitating alignment and indentation testing and thus improving efficiency of process.

Also, in the afore-mentioned embodiments, the FPC or wire to operate the touch panel is primarily connected to the PCB for driving the liquid crystal panel to synchronize touching with operation of the liquid crystal panel.

The touch panel-integrated liquid crystal display device may be applied to cellular phones, mobile equipment such as PDAs, notebooks, monitors, TVs, and the like.

Also, operation mode of the liquid crystal panel may vary configurations of the thin film transistor array and color filter array and examples thereof include TN, IPS, VA and ECB modes.

Meanwhile, the pad portion including the pad electrode in the touch panel partially overlaps the seal pattern of the liquid crystal panel and extends to the periphery thereof, to endure shock applied upon bonding the pad electrode to the FPC for driving the touch panel.

Also, for an on-cell touch panel integrated with a touch panel to reduce panel cost and thickness, wire bonding is used for the contact between the pad electrode connected to the routing line of the touch panel and the board provided with chips to operate touch on the outer surface of the color filter substrate, to reduce defects and inefficient operations due to the step between the FPC bonding portion and the COF bonding portion, and two chips are provided on one FPC, when multiple chips are used, thus providing an efficient interface.

Consequently, when defective elements caused by the step between the FPC bonding portion for driving touch panel and COF bonding portion for driving the liquid crystal panel are removed or multiple chips are used, the number of FPC bonding processes can be reduced, yield can be increased, and module manufacturing process can be easily performed, thus reducing manufacturing costs.

Meanwhile, the mode used for the touch panel may be applied to mutual capacitive mode and self-capacitive mode. For example, a case in which a driving voltage is applied to the first electrode and the second electrode senses voltage drop depending on touch is referred to as a mutual capacitive mode, and a case in which a driving voltage is applied to first and second electrodes, and the first and second electrodes independently sense voltage variation depending on touch is referred to as a self capacitive mode.

The touch panel-integrated liquid crystal display device has the following advantages.

First, unlike a conventional structure in which a touch panel provided with a separate substrate and a plurality of layers arranged thereon is joined to a liquid crystal panel, touch panel electrodes and an insulating layer to protect and contact the same are directly arranged on the outer surface of an upper substrate to constitute the liquid crystal panel, thereby forming the touch panel. As a result, there is no need to increase the number of substrates for the touch panel-integrated liquid crystal display device, to realize a slim device and thus process simplification and cost savings.

Second, the pad electrode of the touch panel is provided on one side of the upper substrate and a flexible printed cable is connected to the pad electrode. As a result, the flexible printed cable is arranged on one layer of the second substrate and the printed circuit board to operate the liquid crystal panel can thus be easily connected. That is, the printed circuit board to operate the liquid crystal panel can be connected by bending the corresponding thickness of the second substrate, and the flexible printed cable can thus be directly bonded to the printed circuit board for driving the liquid crystal panel due to the short distance.

Third, the pad electrode of the touch panel is arranged such that it partially the seal pattern of the liquid crystal panel and extends to the periphery of the seal pattern. As a result, the seal patterns can ensure pressure applied upon connecting (bonding) the pad electrode to the flexible printed cable, damage to the upper substrate can be prevented, and process conditions can be tuned to efficiently bond the pad electrode to the flexible printed cable. In addition, the pad electrode is formed such that it extends to the periphery of the seal pattern, to readily obtain the desired alignment and enable indentation testing after bonding.

Fourth, to drive the touch panel, the wire, instead of the flexible printed cable provided with a controller (chip) for driving the touch panel, is connected to the pad electrode, and a touch panel controller is further provided on the printed circuit board for driving the liquid crystal panel, the touch panel controller is connected to the wire, to solve difficult mounting induced by the step between the upper substrate, on which the touch panel is formed, and the printed circuit board for driving the liquid crystal panel.

Fifth, when the touch panel is divisionally operated, divisional operation number of a plurality of touch panel controllers are formed on the flexible printed cable and circuit mounting can thus be simplified.

Sixth, in the case where the number of electrodes for driving the touch panel is many, when a given number of output pins needs to be assigned to the predetermined chip (touch panel controller), they can be arranged on one flexible printed cable and can be thus readily mounted with the printed circuit board for driving the liquid crystal panel. That is, separate connection of a plurality of chips is not required due to connection of one flexible printed cable to the printed circuit board for driving the liquid crystal panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch panel-integrated liquid crystal display device comprising:
   a liquid crystal panel comprising a first substrate and a second substrate crossing each other, a seal pattern arranged in the edge provided between an upper surface of the first substrate and a lower surface of the second substrate, and a liquid crystal layer filled between the first and second substrates;
   a plurality of first electrodes and second electrodes crossing each other and arranged in the seal pattern on the upper surface of the second substrate;
   a pad electrode for the touch panel partially overlapping the seal pattern and directly contacting the upper surface of the second substrate, the pad electrode extending to the periphery of the seal pattern;
   a pad electrode for the liquid crystal panel arranged at an outside of the seal pattern on the first substrate;
   a chip-on-film (COF) connected to the pad electrode for the liquid crystal panel;
   a printed circuit board for driving the liquid crystal panel, connected to the chip-on-film;
   a routing line to connect the pad electrode for the touch panel to the first electrodes and the second electrodes on the upper surface of the second substrate; and
   a flexible printed cable connected to pad electrodes for the touch panel, to apply driving signals of the first and second electrodes, the flexible printed cable connected to the printed circuit board,
   wherein the flexible printed cable is bent along a side of the second substrate and then connected to the printed circuit board for driving the liquid crystal panel.

2. The liquid crystal display device according to claim 1, further comprising:
   a first polarizing plate arranged on a lower surface of the first substrate; and
   a second polarizing plate on the upper surface of the second substrate, wherein the second polarizing plate is arranged on an entire surface including the first and second electrodes.

3. The liquid crystal display device according to claim 1, wherein the first electrode includes first diamond patterns provided with a plurality of spaced transparent electrodes and a connection metal arranged in a different layer to connect the first diamond patterns adjacent, and the second electrode is a transparent electrode in which a plurality of spaced second diamond patterns are integrated with connection patterns to connect the second diamond patterns adjacent.

4. The liquid crystal display device according to claim 3, wherein the first diamond patterns of the first electrode, and the second diamond patterns and the connection patterns of the second electrode are in the same layer.

5. The liquid crystal display device according to claim 4, further comprising:
   an insulating layer interposed between the upper surface of the second substrate, and the first diamond patterns, the second diamond patterns and the connection patterns,
   wherein the insulating layer is provided with a contact hole to electrically connect the first electrode to the connection metal.

6. The liquid crystal display device according to claim 3, wherein the pad electrode for the touch panel, the routing line and the connection metal are in the same layer.

7. The liquid crystal display device according to claim 1, wherein the printed circuit board for driving the liquid crystal panel and the flexible printed cable are arranged at different sides of the liquid crystal panel.

8. The liquid crystal display device according to claim 1, wherein the flexible printed cable is connected to the printed circuit board for driving the liquid crystal panel via a wire.

9. The liquid crystal display device according to claim 1, wherein the printed circuit board for driving the liquid crystal panel and the flexible printed cable are arranged at the same side of the liquid crystal panel,
   wherein the chip-on-film and the flexible printed cable are alternately connected to the printed circuit board for driving the liquid crystal panel.

10. The liquid crystal display device according to claim 1, wherein the flexible printed cable is provided in plural.

11. The liquid crystal display device according to claim 1, wherein the flexible printed cable is provided with a touch panel controller to apply signals to the first and second electrodes and to detect signals sensed by the electrodes.

12. The liquid crystal display device according to claim 11, wherein the touch panel controller is provided in plural on the flexible printed cable.

13. A touch panel-integrated liquid crystal display device comprising:
   a liquid crystal panel comprising a first substrate and a second substrate crossing each other, a seal pattern arranged in the edge provided between an upper surface of the first substrate and a lower surface of the second substrate, and a liquid crystal layer filled between the first and second substrates;
   a plurality of first electrodes and second electrodes crossing each other, and arranged in the seal pattern on the upper surface of the second substrate;
   a pad electrode for the touch panel partially overlapping the seal pattern and directly contacting the upper surface of the second substrate, the pad electrode extending to the outer periphery of the seal pattern;
   a pad electrode for the liquid crystal panel arranged at an outside of the seal pattern on the first substrate;
   a chip-on-film (COF) connected to the pad electrode for the liquid crystal panel;
   a printed circuit board for driving the liquid crystal panel, connected to the chip-on-film;
   a routing line to connect the pad electrode for the touch panel to the first electrodes and the second electrodes on the upper surface of the second substrate; and
   a wire connected to pad electrodes for the touch panel to apply driving signals of the first and second electrodes, the wire connected to the printed circuit board for driving the liquid crystal panel, wherein the flexible printed cable is bent along a side of the second substrate and then connected to the printed circuit board for driving the liquid crystal panel.

14. The liquid crystal display device according to claim 13, wherein the wire is connected through the chip-on-film to the printed circuit board for driving the liquid crystal panel.

15. The liquid crystal display device according to claim 13, further comprising a touch panel controller to apply signals to the first and second electrodes and to detect signals sensed by the first and second electrodes in the printed circuit board.

16. The liquid crystal display device according to claim 13, wherein the wire is provided in plural.

17. The liquid crystal display device according to claim 13, further comprising:
   a first polarizing plate arranged on an lower surface of the first substrate; and
   a second polarizing plate on the upper surface of the second substrate, wherein the second polarizing plate is arranged on an entire surface including the first and second electrodes.

18. The touch panel-integrated liquid crystal display device according to claim 1, further comprising a black matrix, color filter layers, and a common electrode on the lower surface of the second substrate, wherein the black matrix extends over the seal pattern.

19. The touch panel-integrated liquid crystal display device according to claim 13, further comprising a black matrix, color filter layers, and a common electrode on the lower surface of the second substrate, wherein the black matrix extends over the seal pattern.

\* \* \* \* \*